US012749251B2

(12) United States Patent
Chen

(10) Patent No.: US 12,749,251 B2
(45) Date of Patent: Sep. 29, 2026

(54) VIDEO IMAGE PROCESSING METHOD AND APPARATUS, AND ELECTRONIC DEVICE AND STORAGE MEDIUM

(71) Applicant: Beijing Zitiao Network Technology Co., Ltd., Beijing (CN)

(72) Inventor: Yixin Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 88 days.

(21) Appl. No.: 18/837,573

(22) PCT Filed: Feb. 7, 2023

(86) PCT No.: PCT/CN2023/074765
§ 371 (c)(1),
(2) Date: Aug. 9, 2024

(87) PCT Pub. No.: WO2023/151554
PCT Pub. Date: Aug. 17, 2023

(65) Prior Publication Data

US 2025/0148681 A1 May 8, 2025

(30) Foreign Application Priority Data

Feb. 10, 2022 (CN) ......................... 202210126470.7

(51) Int. Cl.
*G06T 13/00* (2011.01)
*G06T 7/70* (2017.01)
(Continued)

(52) U.S. Cl.
CPC ................ *G06T 13/40* (2013.01); *G06T 7/70* (2017.01); *G06T 17/00* (2013.01); *G06V 40/165* (2022.01); *G06V 40/171* (2022.01)

(58) Field of Classification Search
None
See application file for complete search history.

(56) References Cited

U.S. PATENT DOCUMENTS

2017/0069124 A1* 3/2017 Tong ........................ G06T 17/20
2017/0186237 A1* 6/2017 Hirota ........................ G06T 7/20
(Continued)

FOREIGN PATENT DOCUMENTS

CN 107071580 A 8/2017
CN 108648284 A 10/2018
(Continued)

OTHER PUBLICATIONS

International Patent Application No. PCT/CN2023/074765; Int'l Written Opinion and Search Report; dated May 12, 2023; 7 pages.
(Continued)

*Primary Examiner* — Martin Mushambo
(74) *Attorney, Agent, or Firm* — BakerHostetler

(57) ABSTRACT

A video image processing method and apparatus, and an electronic device and a storage medium are provided. The method includes: in response to an effect triggering operation, displaying a target virtual object model, and acquiring an image to be processed containing a target object, wherein the target virtual object model is played according to a preset basic animation effect; determining at least one overlay animation effect being triggered according to a face image in the image to be processed; overlaying the at least one overlay animation effect for the target virtual object model to obtain a target video frame and display the target video frame.

20 Claims, 4 Drawing Sheets

(51) Int. Cl.

| | |
|---|---|
| ***G06T 13/40*** | (2011.01) |
| ***G06T 17/00*** | (2006.01) |
| ***G06V 40/16*** | (2022.01) |

(56) References Cited

U.S. PATENT DOCUMENTS

| | | | | |
|---|---|---|---|---|
| 2018/0308276 | A1* | 10/2018 | Cohen | G06T 15/205 |
| 2020/0265633 | A1* | 8/2020 | Okutani | G06F 3/012 |
| 2021/0350633 | A1* | 11/2021 | Huang | G06T 19/006 |

FOREIGN PATENT DOCUMENTS

| | | | | | |
|---|---|---|---|---|---|
| CN | 108833818 | A | | 11/2018 | |
| CN | 109922354 | A | | 6/2019 | |
| CN | 111510645 | A | | 8/2020 | |
| CN | 111641844 | A | | 9/2020 | |
| CN | 113163135 | A | | 7/2021 | |
| CN | 113422977 | A | | 9/2021 | |
| CN | 113643411 | A | | 11/2021 | |
| WO | WO-2023279704 | A1 | * | 1/2023 | H04N 21/2187 |

OTHER PUBLICATIONS

China Patent Application No. 202210126470.7; Office Action; dated Apr. 4, 2026; 20 pages.

* cited by examiner

VIDEO IMAGE PROCESSING METHOD AND APPARATUS, AND ELECTRONIC DEVICE AND STORAGE MEDIUM

The application is the U.S. National Stage of International Application No. PCT/CN2023/074765, filed on Feb. 7, 2023, which claims priority from Chinese Patent Application No. 202210126470.7 filed in Chinese Patent Office on Feb. 10, 2022, the entire contents of which are incorporated by reference in the application.

TECHNICAL FIELD

The present disclosure relates to the technical field of image processing, for example, a video image processing method and apparatus, an electronic device and storage medium.

BACKGROUND

With the development of network technology, more and more application programs have entered users' lives, especially a series of software that may shoot short videos, which are deeply loved by users.

In the process of video shooting, it is becoming more and more common to perform the effect display by controlling the virtual object. However, the related effect display technology may only display a single animation effect in the process of video shooting, which leads to some limitations on the presented effect display result.

SUMMARY

The present disclosure provides a video image processing method, a video image processing apparatus, an electronic device and a storage medium, so as to implement playing overlaid various animation effects.

The embodiments of the present disclosure provide a video image processing method, including:

- in response to an effect triggering operation, displaying a target virtual object model, and acquiring an image to be processed containing a target object, wherein the target virtual object model is played according to a preset basic animation effect;
- determining at least one overlay animation effect being triggered according to a
- face image in the image to be processed;
- overlaying the at least one overlay animation effect for the target virtual object model to obtain a target video frame and display the target video frame.

The embodiments of the present disclosure also provide a video image processing apparatus, including:

- an image to be processed acquisition module, configured to display a target virtual object model, and acquire an image to be processed containing a target object in response to an effect triggering operation, wherein the target virtual object model is played according to a preset basic animation effect;
- an overlay animation effect determination module, configured to determine at least one overlay animation effect being triggered according to a face image in the image to be processed;
- a target video frame display module, configured to overlay the at least one overlay animation effect for the target virtual object model to obtain a target video frame and display the target video frame.

Embodiments of the present disclosure also provide an electronic device, including:

- one or more processors;
- a storage apparatus, configured to store one or more programs,
- when the one or more programs are executed by the one or more processors, the
- one or more processors are caused to implement the video image processing method as any one of embodiments of the present disclosure.

Embodiments of the present disclosure also provide a storage medium containing computer-executable instructions. When the computer-executable instructions are executed by a computer processor, the computer-executable instructions perform the video image processing method as any one of the embodiments of the present disclosure.

DETAILED DESCRIPTION

Figure 1:
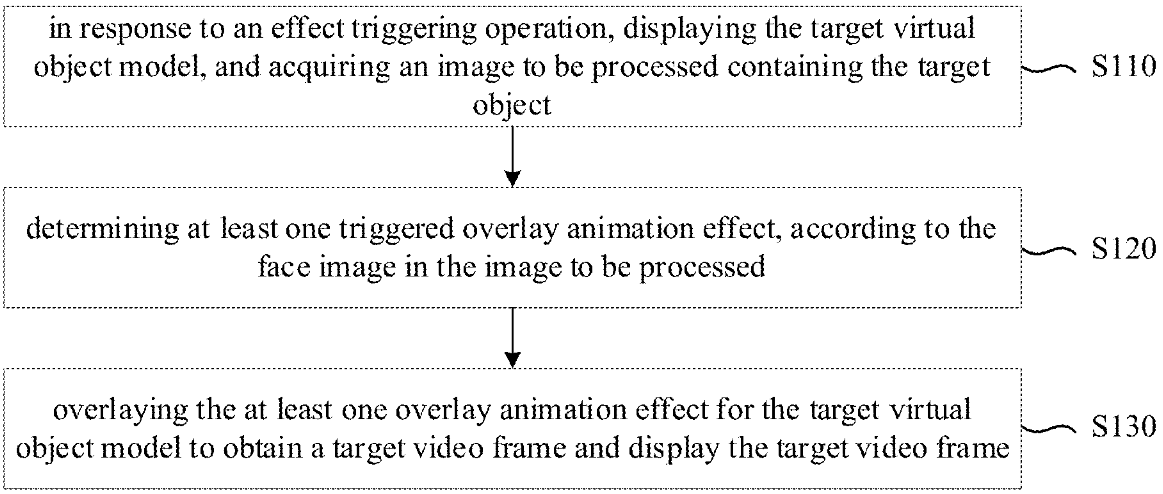
FIG. 1 is a flowchart of a video image processing method provided by Embodiment 1 of the present disclosure.

Embodiments of the present disclosure are described in more detail below with reference to the drawings. Although certain embodiments of the present disclosure are shown in the drawings, the present disclosure may be achieved in various forms and should not be construed as being limited to the embodiments described here. On the contrary, these embodiments are provided to understand the present disclosure more clearly and completely. The drawings and the embodiments of the present disclosure are only for exemplary purposes and are not intended to limit the scope of protection of the present disclosure.

Various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

Concepts such as "first" and "second" mentioned in the present disclosure are only used to distinguish different apparatuses, modules or units, and are not intended to limit orders or interdependence relationships of functions performed by these apparatuses, modules or units. Modifications of "one" and "more" mentioned in the present disclosure are schematic rather than restrictive, and unless otherwise explicitly stated in the context, it should be understood as "one or more".

Names of messages or information exchanged among multiple apparatuses in the embodiment of the present disclosure are only used for illustrative purposes, and are not used to limit the scope of these messages or information.

Before introducing the present technical solution, the application scene may be illustrated firstly. The technical solution of the present disclosure may be applied to any scene required to effect display or effect processing, for example, being applied in the process of video shooting, the shot object may be subject to effect processing to obtain a displayed target effect image; it may also be applied in the process of still image shooting, for example, after the image is shot by the camera provided by the terminal device, the shot image is processed to an effect image for effect display. In the embodiment, the added effect may be jumping up and down, waving left fist and covering effect, and so on. In the embodiment, the target object may be a user, or a variety of shot animals.

Embodiment 1

FIG. 1 is a flowchart diagram of a video image processing method provided by the Embodiment 1 of the present disclosure. The embodiment of the present disclosure is suitable for realizing the simultaneous playing of various animation effects in any effect display or effect processing scene supported by the Internet. The method may be executed by a video image processing apparatus, which may be implemented in the form of software and/or hardware, optionally, by an electronic device, which may be a mobile terminal or a Personal Computer (PC) terminal or a server, and so on.

As illustrated in FIG. 1, the method includes the following steps.

S110: in response to an effect triggering operation, displaying the target virtual object model, and acquiring an image to be processed containing the target object.

The apparatus for executing the video image processing method provided by the embodiment of the present disclosure may be integrated in an application software supporting the video image processing function, and the software may be installed in an electronic device, optionally, the electronic device may be a mobile terminal or a PC terminal, and so on. The application software may be a type of software for image/video processing, and the application software will not be detailed here, provided that it may implement image/video processing. The application software may also be a specially developed application program to implement adding effect and effect display, or it may be integrated in the corresponding pages, and the user may implement the adding effect by the pages integrated in the PC terminal.

The target virtual object model may be an animation model displayed on the display interface, and to be controlled to perform an action. The basic animation effect may be preset for each of virtual object models, and the basic animation effect of the virtual object model is the preset original animation effect. For example, the original animation effect may be at least one of dancing, running or walking. The basic animation effect may change according to the different animation scenes where the target virtual object model is located, and accordingly, the target virtual object model will be played according to the preset basic animation effect. For example, when the animation scene is a stage scene, the basic animation effect may be dancing, and the target virtual object model may be a dancing cartoon character model.

The image to be processed may be an image required to be processed. The image may be an image acquired based on the terminal device. Terminal device may refer to an electronic product with image shooting function, such as a camera, a smart phone and a tablet computer. In practical application, the terminal device is provided with a front camera, a rear camera or other camera apparatuses, and accordingly, the shooting mode may include self-timer and shooting. When the effect triggering operation is detected, whether the target object appears in the view field may be detected according to the shooting mode selected by the user, such as self-timer. When the target object is detected to appear in the view field of the terminal device, the video frame image in the current terminal device may be acquired, and the acquired video frame image is used as an image to be processed; in the process of acquiring image, when it is detected that the video frame image acquired by the current terminal device does not include the target object, the video frame image will not be subject to subsequent process; or, if the target object in the image to be processed is in a static status, the target virtual object model will be played according to the preset basic animation effect until the target object is detected to be changed. Accordingly, the target object may be any object which posture or position information may be changed in the shot picture, such as a user or a pet.

When the image to be processed containing the target object is acquired, the video frame corresponding to the shot video may be processed. For example, the target object corresponding to the shot video may be preset, and when it is detected that the image corresponding to the video frame includes the target object, the image corresponding to the video frame may be used as the image to be processed, so that the target object in each of the video frame images in the video may be tracked subsequently, and the video frame image may be subject to effect processing.

The number of target objects in a same shooting scene may be one or more, no matter one or more, the technical solution provided by the present disclosure may be adopted to determine the effect display video image.

In practical application, usually, upon some effect triggering operations being triggered, the acquiring the image to be processed containing the target object is started. Then, the effect triggering operations include at least one of the following: triggering the effect prop corresponding to the target virtual object model; encompassing a face image in the detected view field region.

A control for triggering the effect prop may be preset. When the user triggers the control, an effect prop display page may pop up on the display interface, and a plurality of effect props may be displayed in the display page. The user may trigger the effect prop corresponding to the target animation. If the effect prop corresponding to the target virtual animation model is triggered, it may mean that the effect triggering operation is triggered. Another implementation may be that the shooting apparatus of the terminal device will have a certain shooting view field. When it is detected that the view field encompasses the face image of the target object, it may mean that the effect triggering operation is triggered. For example, a user may be preset as the target object, and when it is detected that the view field region encompasses the face image of the user, it may be determined that the effect triggering operation is triggered; or, the face image of the target object may be pre-stored in the terminal device, and when it is detected that one or more face images appear(s) in the view field region, if it is detected that one or more face images include(s) the face image of the preset target object, it may be determined that the effect triggering operation is triggered, so that the terminal device may track the face image of the target object and obtain the image to be processed containing the target object.

S120: determining at least one overlay animation effect being triggered, according to the face image in the image to be processed.

The overlay animation effect being triggered may be determined based on the face image in the image to be processed. Accordingly, when the status information of the five facial features of the target object in the image to be processed changes, different animation effects may be triggered. For example, when the mouth of the target object is detected to be in an open status, the overlay animation effect triggered by the face image may be jumping up and down.

The target virtual object model will be played according to the preset basic animation effect in different virtual scenes. If the status information of the five facial features of the image to be processed changes, the target virtual object model of the target object will add other animation effects on the basis of the original basic animation effect, and the animation effects subsequently added to the target virtual object model may be used as the overlay animation effect. Overlaying at least one overlay animation effect may be to overlay a plurality of animation effects into the target virtual object model simultaneously, for example, jumping up and down, waving left fist and waving right fist. If the status information corresponding to the five features in the face image has not changed, the target virtual object model will be played according to the basic animation effect until it is detected that the status information corresponding to the five features in the face image has changed in the image to be processed subsequently acquired, so that the overlay animation effect being triggered may be determined.

For example, a control for stopping shooting may be preset. When it is detected that the user triggers the effect triggering operation, processing each of the acquired images to be processed can be started and the video frame image is generated. When it is detected that the control for stopping shooting is triggered, the target video may be generated according to all the video frame images generated previously.

S130: overlaying the at least one overlay animation effect for the target virtual object model to obtain a target video frame and display the target video frame.

As mentioned above, the target virtual object model will be played according to the preset basic animation effect in different virtual scenes. After determining the at least one overlay animation effect corresponding to a face image of the target object according to the face image, the determined overlay animation effect may be overlaid with the basic animation effect of the target virtual object model, so that the target virtual object model may execute the overlay animation effect while executing the basic animation effect, and use the currently displayed video frame image as the target video frame and display the target video frame.

According to the technical solution of the embodiment of the present disclosure, by responding to the effect triggering operation, the target virtual object model is displayed, and the image to be processed containing the target object is acquired, to determine the face image in the image to be processed, so that at least one overlay animation effect being triggered may be determined according to the face image in the image to be processed, the overlay animation effect is overlaid on the target virtual object model, and finally the target video frame is obtained and displayed. The problem that only a single animation effect may be triggered, and only one of them may be played in the process of the effect playing in prior art is solved, to achieve that various animation effects may be played simultaneously, which enriches the effect display result. Moreover, the animation effect overlaid subsequently may be determined by the face image of the target object, which not only improves the richness and interest of video images, but also enhances the interaction effects with the user.

Figure 2:
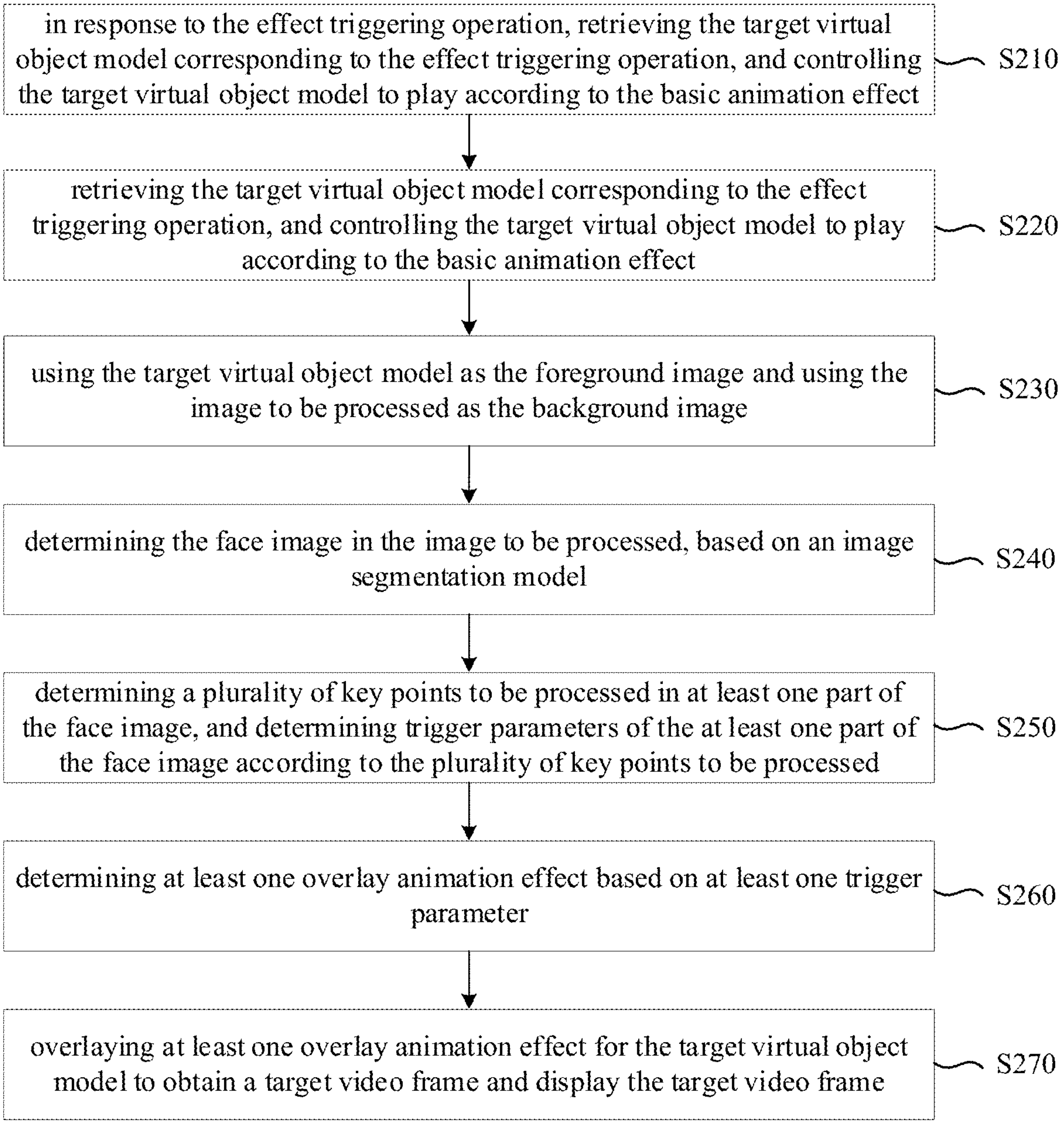
FIG. 2 is a flowchart of a video image processing method provided by Embodiment 2 of the present disclosure.

FIG. 2 is a flowchart of a video image processing method provided by the Embodiment 2 of the present disclosure. On the basis of the aforementioned embodiment, S110 and S120 are illustrated, and the implementation may refer to the technical solution of the embodiment. Technical terms that are the same as or corresponding to the above embodiments will not be repeated here.

Embodiment 2

As illustrated in FIG. 2, the method includes the following steps.

S210: in response to the effect triggering operation, retrieving the target virtual object model corresponding to the effect triggering operation, and controlling the target virtual object model to play according to the basic animation effect.

In practical application, different virtual object models may be preset. When where it is detected that the user triggers the operation of effects, the corresponding virtual object model may be retrieved for the user according to the user's basic registration information as the user's target virtual object model, and the currently retrieved target virtual object model may be controlled to play according to the preset basic animation effect; or, when it is detected that the user triggers the effect triggering operation, an effect prop display page will pop up on the display interface of the terminal device, the display page includes a plurality of virtual object models, so that the user may select according to his/her own preferences, to use the virtual object model selected by the user as the target virtual object model, and control the currently selected target virtual object model to play according to the basic animation effect corresponding to the target virtual object model, and so on. This setting may be personalized according to users' preferences, which enhances the interaction effect with users to a certain extent.

S220: acquiring the image to be processed containing the target object based on the camera apparatus deployed on the terminal device.

Optionally, the terminal device may be a mobile terminal, such as a mobile phone or a tablet computer, or a fixed terminal such as a PC. Accordingly, the camera apparatus deployed on the terminal device may be a built-in camera installed inside the terminal device, such as a front camera or a rear camera; or, it may also be an external camera on the terminal device, and may implement 360-degree rotation function, such as rotating the camera; or, it may also be other camera apparatuses for implementing the image acquisition function, etc., which is not limited by the embodiment of the present disclosure.

Optionally, based on the image to be processed acquired by the camera apparatus, a camera apparatus enable instruction may be input by an input device such as a touch screen or a physical button in the terminal device, to control the camera apparatus on the terminal device to be in a video image shooting mode and acquire the image to be processed;

or, a camera enable control may be preset in the terminal device, and when it is detected that the control is triggered by the user, the camera corresponding to the control may be enabled and the image to be processed may be acquired; or, the video image shooting mode of the camera apparatus may also be enabled in other ways, so as to implement the function of acquiring the image to be processed, which is not limited by the embodiment of the present disclosure.

When it is detected that the user triggers the effect triggering operation, the target virtual object model corresponding to the effect triggering operation is retrieved, and the image to be processed containing the target object is acquired by the camera apparatus on the terminal device, so that the acquired image to be processed may be subject to a plurality of subsequent operations.

S230: using the target virtual object model as the foreground image and using the image to be processed as the background image.

In practical application, in the process of processing the image to be processed, the target virtual object model may be used as the foreground image and the image to be processed may be used as the background image, in order to make the user to capture the effect action performed by the target virtual object model more obviously. This setting may make the user clearly understand the overlay animation effect correspondingly triggered by the status information of the at least one part of the face image in the image to be processed and the effect display of the target virtual object model when the status information changes, and also make the user feel immersive when applying the video image processing application software, which makes the user feel more involved.

S240: determining the face image in the image to be processed, based on an image segmentation model.

In general, the target virtual object model is required to perform corresponding effect action according to the expression change of the target object in the image to be processed. Accordingly, the expression change of the target object is required to be determined according to the face image in the image to be processed. Based on this, the face image in the image to be processed may be determined based on the image segmentation model. Optionally, the parts on the face image include at least two of the left eye part, the right eye part, the left eyebrow part, the right eyebrow part, the nose part and the mouth part.

The image segmentation model may be a neural network model which is pre-trained and is used to implement the target image segmentation. Optionally, the image segmentation model may include at least one network structure of a convolutional neural network, a cyclic neural network and a deep neural network, which is not limited by the embodiment of the present disclosure.

In the embodiment, the image segmentation model may be trained based on the sample image to be processed and the face region labeled image. The face region labeled image may be a Ground Truth image and may be used as a basis for evaluating the subsequent prediction results. The training process of the image segmentation model may be as follows: obtaining the sample image set to be processed, inputting the sample image set to the image segmentation model to be trained, outputting the initial training result, determining the loss result based on the initial training result and the face region labeled image, and adjusting the model parameters in the image segmentation model to be trained based on the loss result and the preset loss function corresponding to the image segmentation model to be trained, to obtain the corresponding adjustment result. In the embodiment, the preset loss function corresponding to the image segmentation model to be trained may be converged as the training target. Based on this, when it is determined that the preset loss function is not converged, it indicates that the adjustment result does not comply with the requirements of model training, and it is necessary to continue to input the sample image set to be processed to train the model. When it is determined that the preset loss function is converged, it indicates that the adjustment result complies with the requirements of model training, to obtain the trained image segmentation model.

S250: determining a plurality of key points to be processed in at least one part of the face image, and determining trigger parameters of the at least one part of the face image according to the plurality of key points to be processed.

At least one part may include one part or a plurality of parts. If more precise control is to be achieved, the at least one part may be a plurality of parts in the face image. Optionally, when the key points to be processed in a part are determined, only the key point information of some specific parts, for example an eye, an eyebrow or a mouth, may be concerned; when the key points to be processed in the plurality of parts are determined, different parts correspond to different trigger parameters, and the key points to be processed in different parts may be determined respectively, and the trigger parameters corresponding to different parts may be determined according to the key points to be processed.

In some embodiments, in order to determine the change information of the at least one part in the face image of the target object in the image to be processed, it is necessary to determine the key point information around the at least one part in the face image. The key points around the at least one part in the face image may be used as a plurality of key points to be processed, and the change information of the at least one part in the face image may be determined by determining the change of the coordinate information of the plurality of key points to be processed, so that the trigger parameters of the at least one part in the face image may be determined according to the key point information to be processed. The trigger parameters may be the parameter information of different animation effects triggered by different movement situations of the key points to be processed of the at least one part. Optionally, the trigger parameters include an overlay animation effect parameter corresponding to the at least one part.

Optionally, determining a plurality of key points to be processed in the at least one part of the face image, and determining the trigger parameters of the at least one part in the face image according to the key points to be processed includes: determining a plurality of key points to be processed in the at least one part of the face image based on a key point identification algorithm; determining the characteristic information of the at least one part by processing the key points to be processed of the at least one part; determining the corresponding trigger parameters based on the characteristic information of the at least one part.

The key point identification algorithm may be a preset algorithm for identifying key points around the at least one part in the face image. The key point identification algorithm may identify the key points around the at least one part of the face image that have changed relatively, and determine the key points that have changed relatively as a plurality of key points to be processed in the part. For example, when the target object opens or closes his/her eyes, the relative positions of the key points around the eyes in the face image of the target object will change. By the key point identification algorithm, the key points around the eyes may be determined as key points to be processed, so that the coordinate information of the key points to be processed may be computed subsequently, to determine relative change of the part corresponding to the coordinate information.

The characteristic information of the at least one part may be information for displaying the current status of the at least one part. For example, for the eyes, the characteristic information may be open or closed; for the mouth, the characteristic information may be open or closed, and it may also include the amplitude information when it is open, etc.

In practical application, after determining a plurality of key points to be processed in the at least one part of the face image, the change of characteristic information of the part may be determined by calculating according to the change of the position information of the key points to be processed. For example, for the eyes, the position change of upper and lower eyelids may be detected, and if they are close, it may be determined that they are currently in a closed status; for the eyebrows, the position change of the key point of eyebrow peak may be detected, and if the position moves up, it may be determined that the eyebrows are currently in the status of picking up eyebrows; for the mouth, the position change of the upper and lower lips may be detected, if the relative distance between the upper and lower lips increases, it may be determined that the mouth is currently open, and so on., and the effect parameter triggered by the characteristic information of the at least one part may be determined.

In some embodiments, the characteristic information of the at least one part is determined by processing the key points to be processed of the at least one part, and the movement information may be determined according to the position change information of the key points of the at least one part in two adjacent images to be processed. For example, one of a plurality of key points to be processed corresponding to the eyes may be used as a reference point, and the position information of the reference point in the two adjacent images to be processed may be determined, and the position offset may be determined according to the formula of the distance between two points, and the position offset may be used as the movement information. If the movement information meets the preset condition, optionally the preset condition is the movement distance, the characteristic information of the movement information may be determined, so that the triggered effect parameter may be determined according to the characteristic information.

Optionally, determining the trigger parameter corresponding to the characteristic information of the at least one part based on the characteristic information of the at least one part includes: determining the trigger parameter corresponding to the characteristic information of the at least one part according to a pre-established parameter mapping relationship table.

In the embodiment, the characteristic information of the at least one part in the face image has different corresponding trigger parameters, and accordingly, different characteristic information of the same part also has certain differences. The trigger parameter may be used to characterize status change information of a part in the face image. For example, when the part in the face image is a mouth, the trigger parameter corresponding to the characteristic information of the part may be the amplitude information of the mouth opening; when the part is an eyebrow, the trigger parameter corresponding to the characteristic information of the part may be the height information of the eyebrow, and so on.

The corresponding relationship between the characteristic information of the at least one part and its corresponding trigger parameter may be pre-established, and a parameter mapping table may be established according to this corresponding relationship. The parameter mapping relationship table includes the trigger parameters corresponding to each of pieces of characteristic information, and the trigger parameter corresponds to the overlay animation effect. Accordingly, the trigger parameter corresponding to the characteristic information of the at least one part may be determined according to the characteristic information of the at least one part, so that the overlay animation effect corresponding to the trigger parameter may be determined.

S260. determining at least one overlay animation effect based on at least one trigger parameter.

At least one trigger parameter corresponding to the change is determined according to the change of key points of the at least one part in the face image. In order to make the target virtual object model being capable of performing the corresponding animation effect according to the change of the at least one part in the face image of the target object, at least one overlay animation effect corresponding to the at least one trigger parameter may be determined according to the at least one trigger parameter. The number of overlay animation effects may be determined according to the change of the at least one part of the face image of the target object in the image to be processed. For example, when it is detected that the user blinks his/her left eye while opening his/her mouth at the same time, there may be two overlay animation effects corresponding to the change, which are switching loop animation and waving left fist, respectively.

Optionally, determining the at least one overlay animation effect based on the at least one trigger parameter includes: determining the overlay animation effect corresponding to the at least one trigger parameter, and determining amplitude information and duration information of the overlay animation effect, according to the at least one trigger parameter so as to display the corresponding overlay animation effect based on the amplitude information and the duration information.

The amplitude information of the overlay animation effects may be the intensity information of the target virtual object model in performing the corresponding animation effect. The amplitude information of the overlay animation effect may correspond to the change amplitude of the corresponding part in the face image of the target object. When the change amplitude of a part in the face image of the target object becomes larger and larger, the amplitude information of the overlay animation effect corresponding to the part may become larger with it, that is, the intensity information of the target virtual object model in performing the corresponding animation effect becomes larger. For example, when the target object is in the status of opening mouth, the overlay animation effect corresponding to the status of opening mouth is switching loop animation, and when the mouth of the target object is opening wider and wider, the speed of switching loop animation may be faster and faster. The duration information of the overlay animation effect may be the duration information of the target virtual object model in performing the corresponding animation effect. For example, when the overlay animation effect is waving left fist, the duration information of the overlay animation effect is the duration information of the target virtual object model in performing waving left fist.

In practical application, the corresponding relationship between the trigger parameters and the overlay animation effects, as well as the corresponding relationship between the trigger parameters and amplitude information and duration of the overlay animation effects may be pre-established, and the corresponding mapping table may be established, so that after determining the at least one trigger parameter, the overlay animation effect corresponding to the at least one trigger parameter may be determined and the amplitude information and the duration information in performing the overlay animation effect may be determined based on at least one trigger parameter, so that the corresponding overlay animation effect may be displayed on the display interface based on the amplitude information and the duration information.

For example, when two or more parts in the face image of the target object change, the overlay animation effects corresponding to this status may be mixed and overlaid to the target virtual object model, and different mixing ratios may correspond according to the changing amplitude of different parts, so that the target virtual object model may be played accordingly according to the mixing ratio. For example, when it is detected that the user blinks his/her left eye while opening his/her mouth at the same time, the overlay animation effects corresponding to this status are switching loop animation and waving left fist respectively, and the target virtual object model may perform the above two overlay animation effects simultaneously. And when it is detected that the amplitude of the user's mouth opening becomes larger, the corresponding overlay animation effect in this status will also become larger, that is, the speed of switching loop animation becomes faster and faster, or, when it is detected that the time of the user blinking his/her left eye becomes longer, the duration of the overlay animation effect corresponding to this status will also become longer, that is, the target virtual object model is always in the status of waving left fist, and accordingly, the mixing ratio of the overlay animation effects may be determined according to the changes of different parts in the face image of the target object, so that the target virtual object model may correspondingly play different mixing animation effects according to different mixing ratios. This setting may freely mix a group of unique animation effects by the face expression changes of the target object, and the target virtual object model may be controlled to play according to the mixed animation effects.

When the key point information of more than two parts in the face image of the target object changes, it may overlay on the basis of the two parts, that is, the target virtual object model may perform more than two overlay animation effects simultaneously.

S270: overlaying at least one overlay animation effect for the target virtual object model to obtain a target video frame and display the target video frame.

According to the technical solution of the embodiment of the present disclosure, by responding to the effect triggering operation, the target virtual object model corresponding to the effect triggering operation is retrieved, and the target virtual object model is controlled to play according to the basic animation effect, meanwhile, the image to be processed containing the target object is acquired based on the camera apparatus on the terminal device, and then the face image in the image to be processed is determined based on the image segmentation model, and a plurality of key points to be processed in the at least one part of the face image are determined, the trigger parameter of the at least one part in the face image is determined according to the key points to be process, so that the at least one overlay animation effect may be determined according to the at least one trigger parameter, the overlay animation effect is overlaid on the target virtual object model, and finally the target video frame is obtained and displayed, which implements, by controlling the virtual object model corresponding to the expression change of the face image of the target object in the image to be processed, performing and displaying a plurality of effect actions simultaneously according to the expression change, which enriches the effect display result, and the face image in the image to be processed is segmented based on the image segmentation model, so that the change of the at least one part in the face image may be captured more accurately, thus achieving the result of accurately triggering corresponding animation effect.

Embodiment 3

Figure 3:
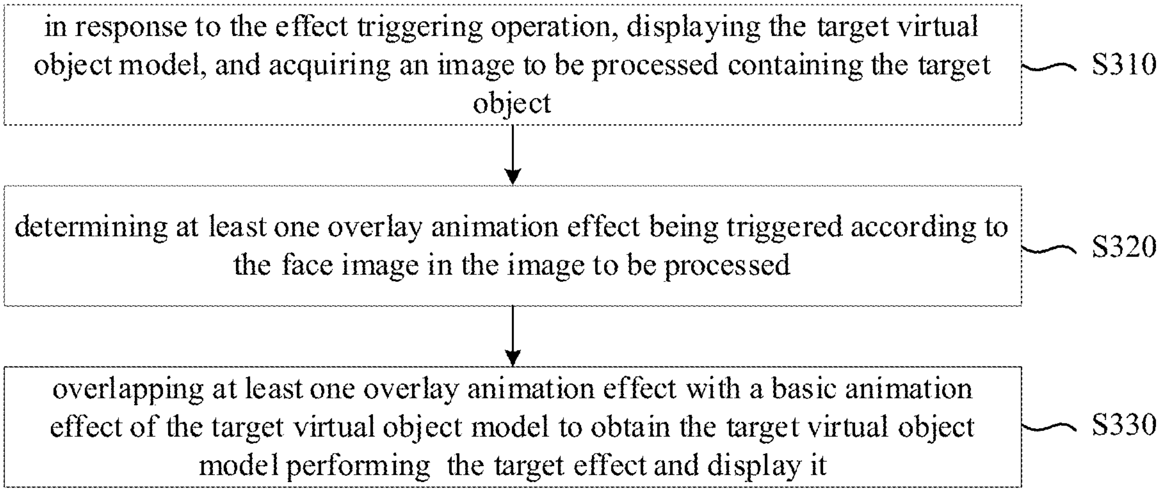
FIG. 3 is a flowchart of a video image processing method provided by Embodiment 3 of the present disclosure.

FIG. 3 is a flowchart of a video image processing method provided by Embodiment 3 of the present disclosure. On the basis of the aforementioned embodiment, S130 is described, and the implementation may refer to the technical solution of the embodiment. Technical terms that are the same as or corresponding to the above embodiments are not repeated here.

As illustrated in FIG. 3, the method includes the following steps.

S310: in response to the effect triggering operation, displaying the target virtual object model, and acquiring an image to be processed containing the target object.

S320: determining at least one overlay animation effect being triggered according to the face image in the image to be processed.

S330: overlapping the at least one overlay animation effect with a basic animation effect of the target virtual object model to obtain the target virtual object model performing the target effect and display it.

In the embodiment, the target virtual object model will have basic animation effects corresponding to the target virtual object model according to the different virtual scenes where the target virtual object model is located. Thus, the target effect may include the basic animation effect and at least one overlay animation effect of the target virtual object model.

For example, according to the change of key points of at least one part of the face image in the image to be processed, at least one overlay animation effect triggered by the change of key points may be determined, and the determined overlay animation effect may be overlaid with the current basic animation effect of the target virtual object model, which may obtain the target virtual object model that performs both the basic animation effect and the overlay animation effect, and may display and play the target video frame determined based on the current target effect display parameters.

For example, the target video frame may include the target virtual object model for performing the target effect and the target object, the target object is a background image and the target virtual object model is a foreground image.

On the basis of the above technical solution, when acquiring the image to be processed containing the target object, the method further includes determining relative position information between the target object and the camera apparatus, so as to adjust the display position information of the target virtual object model in the target video frame based on the relative position information.

Generally, when the camera apparatus on the terminal device acquires the image to be processed containing the target object, there will be a distance between the target object and the camera apparatus, and the distance information between the target object and the camera apparatus may be used as the relative position information. When the target virtual object model is displayed on the display interface of the terminal device, the position of the target virtual object model changes, which is determined according to the moving of the target object. Accordingly, when the image to be processed is acquired, the relative position information between the target object and the camera apparatus is determined at the same time, so as to adjust the display position of the target virtual object model in the target video frame image according to the relative position information, so that the target object is used as the background image in the image in the target video frame, to control the target virtual object model in the foreground image to perform the effect display video image of the corresponding animation effect.

According to the technical solution of the embodiment of the disclosure, by responding to the effect triggering operation, the target virtual object model is displayed, and the image to be processed containing the target object is acquired, and then at least one overlay animation effect being triggered is determined according to the face image in the image to be processed, and the overlay animation effect is overlaid with the basic animation effect of the target virtual object to obtain the target virtual object model for performing the target effect and display the target virtual object model, which implements that a plurality of animation effects may be simultaneously played in the same video frame image, to enrich the effect display result.

Embodiment 4

Figure 4:
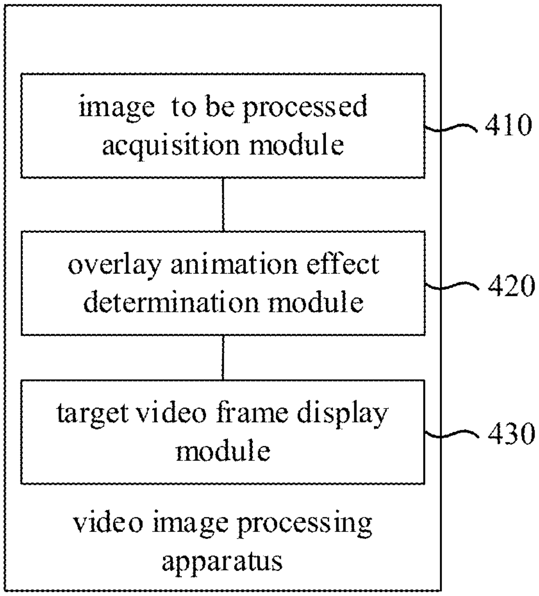
FIG. 4 is a structural diagram of a video image processing apparatus provided by Embodiment 4 of the present disclosure.

FIG. 4 is a schematic structural diagram of a video image processing apparatus provided by Embodiment 4 of the present disclosure. As illustrated in FIG. 4, the apparatus includes an image to be processed acquisition module 410, an overlay animation effect determination module 420 and a target video frame display module 430.

The image to be processed acquisition module 410, is configured to display a target virtual object model, and acquire an image to be processed containing a target object in response to an effect triggering operation, wherein the target virtual object model is played according to a preset basic animation effect; the overlay animation effect determination module 420 is configured to determine at least one overlay animation effect being triggered according to a face image in the image to be processed; the target video frame display module 430 is configured to overlay the at least one overlay animation effect for the target virtual object model to obtain a target video frame and display the target video frame.

The effect triggering operation includes at least one of the following: triggering an effect prop corresponding to the target virtual object model; encompassing the face image in a detected view field region.

On the basis of the above plurality of technical solutions, the image to be processed acquisition module 410 includes a virtual object model retrieving unit and an image to be processed acquisition unit.

The virtual object model retrieving unit is configured to retrieve the target virtual object model corresponding to the effect triggering operation, and control the target virtual object model to play according to the basic animation effect;

The image to be processed acquisition unit is configured to acquire the image to be processed containing the target object based on a camera apparatus deployed on a terminal device.

On the basis of the above plurality of technical solutions, after acquiring the image to be processed containing the target object, the apparatus further includes a foreground image and a background image determination module.

The foreground image and background image determination module is configured to use the target virtual object model as a foreground image and use the image to be processed as a background image.

On the basis of the above plurality of technical solutions, the overlay animation effect determination module 420 includes a face image determination unit, a trigger parameter determination unit and an overlay animation effect determination unit.

The face image determination unit is configured to determine the face image in the image to be processed based on an image segmentation model;

The trigger parameter determination unit is configured to determine a plurality of key points to be processed of at least one part in the face image, and determine a trigger parameter of the at least one part in the face image according to the key points to be processed;

The overlay animation effect determination unit is configured to determine at least one overlay animation effect based on at least one trigger parameter.

On the basis of the above plurality of technical solutions, the trigger parameter determination unit includes a key point to be processed determination sub-unit, a characteristic information determination sub-unit and a trigger parameter determination sub-unit.

The key point determination sub-unit is configured to determine the plurality of key points to be processed of the at least one part in the face image based on a key point identification algorithm;

The characteristic information determination sub-unit is configured to determine characteristic information of the at least one part by processing the key points to be processed of the at least one part;

The trigger parameter determination sub-unit is configured to determine the trigger parameter corresponding to the characteristic information of the at least one part based on the characteristic information of the at least one part.

On the basis of the above plurality of technical solutions, the trigger parameter determination sub-unit is configured to determine the trigger parameter corresponding to the characteristic information of the at least one part according to a pre-established parameter mapping relationship table; wherein the parameter mapping relationship table includes the trigger parameter corresponding to each of pieces of characteristic information, and the trigger parameter corresponds to the overlay animation effect.

On the basis of the above plurality of technical solutions, the overlay animation effect determination unit is configured to determine the corresponding overlay animation effect, and determine amplitude information and duration information of the overlay animation effect according to the at least one trigger parameter, so as to display the corresponding overlay animation effect based on the amplitude information and the duration information.

On the basis of the above plurality of technical solutions, parts on the face image includes at least two of a left eye part, a right eye part, a left eyebrow part, a right eyebrow part, a nose part and a mouth part;

Accordingly, the trigger parameter includes an overlay animation effect parameter corresponding to the at least one part.

On the basis of the above plurality of technical solutions, the target video frame display module 430 is configured to overlay the at least one overlay animation effect with the basic animation effect of the target virtual object model to obtain a target virtual object model for performing the target effect, and displaying it;

The target video frame includes the target virtual object model for performing the target effect and the target object, the target object is a background image and the target virtual object model is a foreground image.

On the basis of the above plurality of technical solutions, the apparatus further includes a relative position information determination module.

The relative position information determination module is configured to determine relative position information between the target object and a camera apparatus, so as to adjust display position information of the target virtual object model in the target video frame based on the relative position information.

According to the technical solution of the embodiment of the disclosure, by responding to the effect triggering operation, the target virtual object model is displayed, and the image to be processed containing the target object is acquired, to determine the face image in the image to be processed, so that at least one overlay animation effect being triggered may be determined according to the face image in the image to be processed, the overlay animation effect is overlaid on the target virtual object model, and finally the target video frame is obtained and displayed. The problem that in the video image processing technology, only a single animation effect may be triggered, and only one of the animation effects may be played in the process of the effect playing in prior art is solved, to achieve that various animation effects may be played simultaneously, which enriches the effect display result. Moreover, the animation effect overlaid subsequently is determined by the face image of the target object, which not only improves the richness and interest of video images, but also enhances the interaction effects with the user.

The video image processing apparatus provided by the embodiment of the present disclosure may execute the video image processing method provided by any embodiment of the present disclosure, and has corresponding functional modules and effects.

A plurality of units and modules included in the above apparatus can be only divided according to functional logic, but are not limited to the above division, provided that corresponding functions can be implemented; in addition, the names of a plurality of functional units are only for the convenience of distinguishing each other, and are not used to limit the protection scope of the embodiment of the present disclosure.

Embodiment 5

Figure 5:
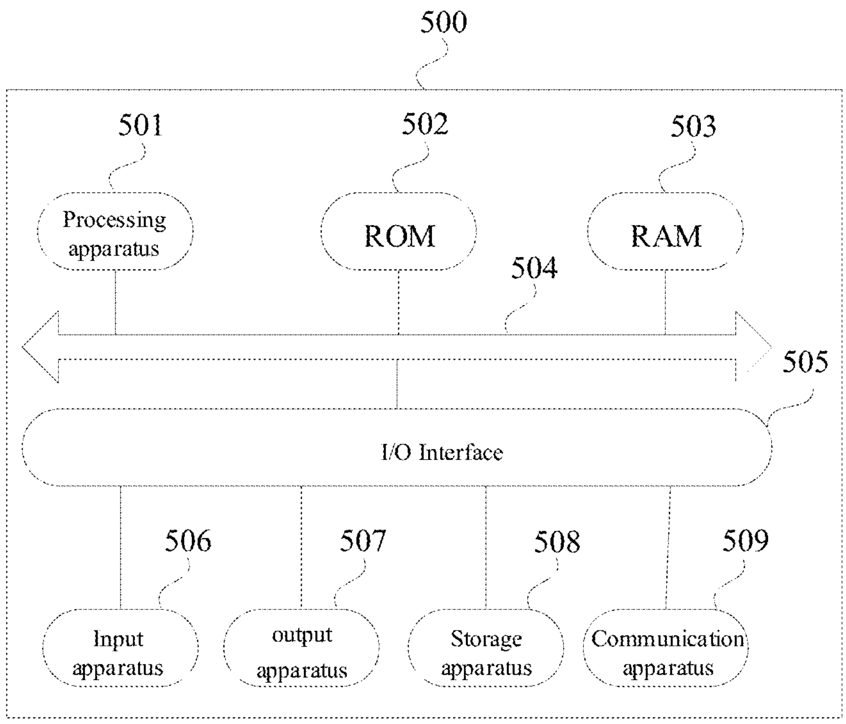
FIG. 5 is a structural diagram of an electronic device provided by Embodiment 5 of the present disclosure.

FIG. 5 is a schematic structural diagram of an electronic device provided in Embodiment 5 of the present disclosure. Referring to FIG. 5, FIG. 5 illustrates a schematic structural diagram of an electronic device (e.g., a terminal device or a server in FIG. 5) 500 suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals such as a digital TV, a desktop computer, or the like. The electronic device illustrated in FIG. 5 is merely an example, and should not pose any limitation to the functions and the range of use of the embodiments of the present disclosure.

As illustrated in FIG. 5, the electronic device 500 may include a processing apparatus 501 (e.g., a central processing unit, a graphics processing unit, etc.), which can perform various suitable actions and processing according to a program stored in a read-only memory (ROM) 502 or a program loaded from a storage apparatus 508 into a random-access memory (RAM) 503. The RAM 503 further stores various programs and data required for operations of the electronic device 500. The processing apparatus 501, the ROM 502, and the RAM 503 are interconnected by means of a bus 504. An input/output (I/O) interface 505 is also connected to the bus 504.

The following apparatus may be connected to the I/O interface 505: an input apparatus 506 including, for example, a touch screen, a touch pad, a keyboard, a mouse, a camera, a microphone, an accelerometer, a gyroscope, or the like; an output apparatus 507 including, for example, a liquid crystal display (LCD), a loudspeaker, a vibrator, or the like; a storage apparatus 508 including, for example, a magnetic tape, a hard disk, or the like; and a communication apparatus 509. The communication apparatus 509 may allow the electronic device 500 to be in wireless or wired communication with other devices to exchange data. While FIG. 5 illustrates the electronic device 500 having various apparatuses, not all of the illustrated apparatuses are necessarily implemented or included. More or fewer apparatuses may be implemented or included alternatively.

According to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 509 and installed, or may be installed from the storage apparatus 508, or may be installed from the ROM 502. When the computer program is executed by the processing apparatus 501, the above-mentioned functions defined in the methods of some embodiments of the present disclosure are performed.

Names of messages or information exchanged among multiple apparatuses in the embodiment of the present disclosure are only used for illustrative purposes, and are not used to limit the scope of these messages or information.

The electronic device provided by the embodiment of this disclosure belongs to the same concept as the video image processing method provided by the above embodiments, and the technical details not described in detail in this embodiment may be found in the above embodiments, and this embodiment has the same effect as the above embodiments.

Embodiment 6

An embodiment of the present disclosure provides a computer storage medium on which a computer program is stored. When the computer program is executed by a processor, the video image processing method provided in the above embodiments is implemented.

The above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not be limited to: an electric connector with one or more wires, a portable computer magnetic disk, a hard disk drive, a RAM, a ROM, an erasable programmable read-only memory (EPROM), a flash memory, an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The computer-readable medium carries one or more programs. The one or more programs, when executed by the electronic device, cause the electronic device to:

- in response to the effect triggering operation, display a target virtual object model and acquire an image to be processed containing the target object; wherein the target virtual object model is played according to a preset basic animation effect;
- determine at least one overlay animation effect being triggered according to a face image in the image to be processed;
- overlay the at least one overlay animation effect for the target virtual object model to obtain a target video frame and display the target video frame.

The computer program code for executing the operation of the present disclosure may be written in one or more programming languages or combinations thereof, the above programming language includes but is not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. In some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. Each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances. For example, the first acquisition unit may also be described as "the unit that acquires at least two Internet protocol addresses".

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, RAM, ROM, EPROM, flash memory, optical fiber, portable CD-ROM, optical storage device, magnetic storage device, or any suitable combination of the foregoing. The storage medium can be a non-transitory storage medium.

According to one or more embodiments of the present disclosure, [Example 1] provides a video image processing method, including:

in response to an effect triggering operation, displaying a target virtual object model, and acquiring an image to be processed containing a target object, wherein the target virtual object model is played according to a preset basic animation effect;

determining at least one overlay animation effect being triggered according to a face image in the image to be processed;

overlaying the at least one overlay animation effect for the target virtual object model to obtain a target video frame and display the target video frame.

According to one or more embodiments of the present disclosure, [Example 2] provides a video image processing method. The method further includes:

optionally, the effect triggering operation includes at least one of the following: triggering an effect prop corresponding to the target virtual object model;

encompassing the face image in a detected view field region.

According to one or more embodiments of the present disclosure, [Example 3] provides a video image processing method. The method further includes:

optionally, the displaying a target virtual object model and acquiring an image to be processed containing a target object includes:

retrieving the target virtual object model corresponding to the effect triggering operation, and controlling the target virtual object model to play according to the basic animation effect;

acquiring the image to be processed containing the target object based on a camera apparatus deployed on a terminal device.

According to one or more embodiments of the present disclosure, [Example 4] provides a video image processing method. After the acquiring an image to be processed containing a target object, the method further includes:

optionally, using the target virtual object model as a foreground image and using the image to be processed as a background image.

According to one or more embodiments of the present disclosure, [Example 5] provides a video image processing method. The method further includes:

optionally, the determining at least one overlay animation effect being triggered according to a face image in the image to be processed includes:

determining the face image in the image to be processed based on an image segmentation model;

determining a plurality of key points to be processed of at least one part in the face image, and determining a trigger parameter of the at least one part in the face image according to the plurality of key points to be processed;

determining the at least one overlay animation effect based on at least one trigger parameter.

According to one or more embodiments of the present disclosure, [Example 6] provides a video image processing method. The method further includes:

optionally, the determining a plurality of key points to be processed of at least one part in the face image, and determining trigger parameters of the at least one part in the face image according to the plurality of key points to be processed includes:

determining the plurality of key points to be processed of the at least one part in the face image based on a key point identification algorithm;

determining characteristic information of the at least one part by processing the key points to be processed of the at least one part;

determining the trigger parameter corresponding to the characteristic information of the at least one part based on the characteristic information of the at least one part.

According to one or more embodiments of the present disclosure, [Example 7] provides a video image processing method. The method further includes:

optionally, the determining the trigger parameter corresponding to the characteristic information of the at least one part based on the characteristic information of the at least one part includes:

determining the trigger parameter corresponding to the characteristic information of the at least one part according to a pre-established parameter mapping relationship table;

wherein the parameter mapping relationship table includes the trigger parameter corresponding to each of pieces of characteristic information, and the trigger parameter corresponds to the overlay animation effect.

According to one or more embodiments of the present disclosure, [Example 8] provides a video image processing method. The method further includes:

optionally, the determining the at least one overlay animation effect based on at least one trigger parameter includes:

determining the corresponding overlay animation effect, and determining amplitude information and duration information of the at least one overlay animation effect according to the at least one trigger parameter, so as to display the corresponding overlay animation effect based on the amplitude information and the duration information.

According to one or more embodiments of the present disclosure, [Example 9] provides a video image processing method. The method further includes:

optionally, parts on the face image includes at least two of a left eye part, a right eye part, a left eyebrow part, a right eyebrow part, a nose part and a mouth part;

correspondingly, the trigger parameter includes an overlay animation effect parameter corresponding to the at least one part.

According to one or more embodiments of the present disclosure, [Example 10] provides a video image processing method. The method further includes:

the overlaying the at least one overlay animation effect for the target virtual object model to obtain a target video frame and display the target video frame includes:

optionally, overlaying the at least one overlay animation effect with the basic animation effect of the target virtual object model to obtain a target virtual object model for performing the target effect, and displaying the target virtual object model;

wherein the target video frame includes the target virtual object model for performing the target effect and the target object, the target object is a background image and the target virtual object model is a foreground image.

According to one or more embodiments of the present disclosure, [Example 11] provides a video image processing method. the method further includes:

optionally, when the acquiring includes the image to be processed of the target object, the method further includes:

determining relative position information between the target object and a camera apparatus, so as to adjust display position information of the target virtual object model in the target video frame based on the relative position information.

According to one or more embodiments of the present disclosure, [Example 12] provides a video image processing apparatus. The apparatus includes:

an image to be processed acquisition module, configured to display a target virtual object model, and acquire an image to be processed containing a target object in response to an effect triggering operation, wherein the target virtual object model is played according to a preset basic animation effect;

an overlay animation effect determination module, configured to determine at least one overlay animation effect being triggered according to a face image in the image to be processed;

a target video frame display module, configured to overlay the at least one overlay animation effect for the target virtual object model to obtain a target video frame and display the target video frame.

The foregoing are merely descriptions of the optional embodiments of the present disclosure and the explanations of the technical principles involved. The scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein to form technical solutions.

In addition, while a plurality of operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, the subject matter defined in the appended claims is not necessarily limited to the particular features and acts described above. Rather, the particular features and acts described above are merely exemplary forms for implementing the claims.

The invention claimed is:

1. A video image processing method, comprising:

in response to an effect triggering operation, displaying a target virtual object model, and acquiring an image to be processed containing a target object, wherein the target virtual object model is played according to a preset basic animation effect;

determining at least one overlay animation effect being triggered according to a face image in the image to be processed, wherein determining the at least one overlay animation effect being triggered according to the face image in the image to be processed comprises:

determining the face image in the image to be processed based on an image segmentation model, determining a plurality of key points to be processed of at least one part in the face image, and determining at least one trigger parameter of the at least one part in the face image according to the plurality of key points to be processed, and determining the at least one overlay animation effect based on the at least one trigger parameter; and overlaying the at least one overlay animation effect for the target virtual object model to obtain a target video frame and display the target video frame.

2. The method according to claim 1, wherein the effect triggering operation comprises at least one of:

triggering an effect prop corresponding to the target virtual object model; or encompassing the face image in a detected view field region.

3. The method according to claim 1, wherein the displaying the target virtual object model and acquiring the image to be processed containing the target object comprises:

retrieving the target virtual object model corresponding to the effect triggering operation, and controlling the target virtual object model to play according to the basic animation effect; and acquiring the image to be processed containing the target object based on a camera apparatus deployed on a terminal device.

4. The method according to claim 1, wherein after the acquiring the image to be processed containing the target object, the method further comprises:

using the target virtual object model as a foreground image and using the image to be processed as a background image.

5. The method according to claim 1, wherein the determining the plurality of key points to be processed of the at least one part in the face image, and determining the at least one trigger parameter of the at least one part in the face image according to the plurality of key points to be processed comprises:

determining the plurality of key points to be processed of the at least one part in the face image based on a key point identification algorithm;

determining characteristic information of the at least one part by processing the key points to be processed of the at least one part; and determining the at least one trigger parameter corresponding to the characteristic information of the at least one part based on the characteristic information of the at least one part.

6. The method according to claim 5, wherein the determining the at least one trigger parameter corresponding to the characteristic information of the at least one part based on the characteristic information of the at least one part comprises:

determining the trigger parameter corresponding to the characteristic information of the at least one part according to a pre-established parameter mapping relationship table, wherein the parameter mapping relationship table comprises the trigger parameter corresponding to each of pieces of characteristic information, and the trigger parameter corresponds to the overlay animation effect.

7. The method according to claim 5, wherein the determining the at least one overlay animation effect based on the at least one trigger parameter comprises:

determining the at least one overlay animation effect corresponding to the at least one trigger parameter, and determining amplitude information and duration information of the at least one overlay animation effect according to the at least one trigger parameter, so as to display the corresponding overlay animation effect based on the amplitude information and the duration information.

8. The method according to claim 5, wherein parts on the face image comprises at least two of a left eye part, a right eye part, a left eyebrow part, a right eyebrow part, a nose part and a mouth part; and wherein the at least one trigger parameter comprises an overlay animation effect parameter corresponding to the at least one part.

9. The method according to claim 1, wherein the overlaying the at least one overlay animation effect for the target virtual object model to obtain a target video frame and display the target video frame comprises:

overlaying the at least one overlay animation effect with the basic animation effect of the target virtual object model to obtain a target virtual object model for performing the target effect, and displaying the target virtual object model, wherein the target video frame comprises the target virtual object model for performing the target effect and the target object, the target object is a background image and the target virtual object model is a foreground image.

10. The method according to claim 1, wherein the method further comprises:

determining relative position information between the target object and a camera apparatus, so as to adjust display position information of the target virtual object model in the target video frame based on the relative position information.

11. An electronic device comprising:

at least one processor;

at least one storage apparatus, configured to store at least one program, wherein, when the at least one program is executed by the at least one processor, the at least one processor is caused to implement operations which comprise:

in response to an effect triggering operation, displaying a target virtual object model, and acquiring an image to be processed containing a target object, wherein the target virtual object model is played according to a preset basic animation effect;

determining at least one overlay animation effect being triggered according to a face image in the image to be processed, wherein determining the at least one overlay animation effect being triggered according to the face image in the image to be processed comprises:

determining the face image in the image to be processed based on an image segmentation model, determining a plurality of key points to be processed of at least one part in the face image, and determining at least one trigger parameter of the at least one part in the face image according to the plurality of key points to be processed, and determining the at least one overlay animation effect based on the at least one trigger parameter; and overlaying the at least one overlay animation effect for the target virtual object model to obtain a target video frame and display the target video frame.

12. The electronic device of claim 11, wherein the effect triggering operation comprises at least one of:

triggering an effect prop corresponding to the target virtual object model; or encompassing the face image in a detected view field region.

13. The electronic device of claim 11, wherein the displaying the target virtual object model and acquiring the image to be processed containing the target object comprises:

retrieving the target virtual object model corresponding to the effect triggering operation, and controlling the target virtual object model to play according to the basic animation effect; and acquiring the image to be processed containing the target object based on a camera apparatus deployed on a terminal device.

14. The electronic device of claim 11, wherein after the acquiring the image to be processed containing the target object, the operations further comprise:

using the target virtual object model as a foreground image and using the image to be processed as a background image.

15. The electronic device of claim 11, wherein the determining the plurality of key points to be processed of the at least one part in the face image, and determining the at least one trigger parameter of the at least one part in the face image according to the plurality of key points to be processed comprises:

determining the plurality of key points to be processed of the at least one part in the face image based on a key point identification algorithm;

determining characteristic information of the at least one part by processing the key points to be processed of the at least one part; and determining the at least one trigger parameter corresponding to the characteristic information of the at least one part based on the characteristic information of the at least one part.

16. The electronic device of claim 15, wherein the determining the at least one trigger parameter corresponding to the characteristic information of the at least one part based on the characteristic information of the at least one part comprises:

determining the trigger parameter corresponding to the characteristic information of the at least one part according to a pre-established parameter mapping relationship table, wherein the parameter mapping relationship table comprises the trigger parameter corresponding to each of pieces of characteristic information, and the trigger parameter corresponds to the overlay animation effect.

17. The electronic device of claim 15, wherein the determining the at least one overlay animation effect based on the at least one trigger parameter comprises:

determining the at least one overlay animation effect corresponding to the at least one trigger parameter, and determining amplitude information and duration information of the at least one overlay animation effect according to the at least one trigger parameter, so as to display the corresponding overlay animation effect based on the amplitude information and the duration information.

18. A non-transitory computer-readable storage medium containing computer-executable instructions, wherein, when the computer-executable instructions are executed by a computer processor, the computer executable-instructions perform operations which comprise:

in response to an effect triggering operation, displaying a target virtual object model, and acquiring an image to be processed containing a target object, wherein the target virtual object model is played according to a preset basic animation effect;

determining at least one overlay animation effect being triggered according to a face image in the image to be processed, wherein determining the at least one overlay animation effect being triggered according to the face image in the image to be processed comprises:

determining the face image in the image to be processed based on an image segmentation model, determining a plurality of key points to be processed of at least one part in the face image, and determining at least one trigger parameter of the at least one part in the face image according to the plurality of key points to be processed, and determining the at least one overlay animation effect based on the at least one trigger parameter; and overlaying the at least one overlay animation effect for the target virtual object model to obtain a target video frame and display the target video frame.

19. The non-transitory computer-readable storage medium of claim 18, wherein the effect triggering operation comprises at least one of:

triggering an effect prop corresponding to the target virtual object model; or encompassing the face image in a detected view field region.

20. The non-transitory computer-readable storage medium of claim 18, wherein determining the plurality of key points to be processed of the at least one part in the face image, and determining the at least one trigger parameter of the at least one part in the face image according to the plurality of key points to be processed comprises:

determining the plurality of key points to be processed of the at least one part in the face image based on a key point identification algorithm;

determining characteristic information of the at least one part by processing the key points to be processed of the at least one part; and determining the at least one trigger parameter corresponding to the characteristic information of the at least one part based on the characteristic information of the at least one part.

* * * * *